US012774659B2

(12) United States Patent
Stramare et al.

(10) Patent No.: US 12,774,659 B2
(45) Date of Patent: Oct. 27, 2026

(54) PRE-SINTERED PREFORM WITH HIGH TEMPERATURE CAPABILITY, IN PARTICULAR AS ABRASIVE COATING FOR GAS TURBINE BLADES

(71) Applicant: NUOVO PIGNONE TECNOLOGIE—SRL, Florence (IT)

(72) Inventors: Stefania Stramare, Florence (IT); Leonardo Tognarelli, Florence (IT); Vittorio Michelassi, Florence (IT); Gino Baldi, Florence (IT); Gabriele Masi, Florence (IT)

(73) Assignee: Nuovo Pignone Tecnologie S.R.L., Florence (IT)

( * ) Notice: Subject to any disclaimer, the term of this patent is extended or adjusted under 35 U.S.C. 154(b) by 4 days.

(21) Appl. No.: 18/260,732

(22) PCT Filed: Jan. 10, 2022

(86) PCT No.: PCT/EP2022/025007
§ 371 (c)(1),
(2) Date: Jul. 7, 2023

(87) PCT Pub. No.: WO2022/152579
PCT Pub. Date: Jul. 21, 2022

(65) Prior Publication Data

US 2024/0068371 A1 Feb. 29, 2024

(30) Foreign Application Priority Data

Jan. 14, 2021 (IT) ........................ 102021000000626

(51) Int. Cl.
*F01D 5/28* (2006.01)
*F01D 11/12* (2006.01)

(52) U.S. Cl.
CPC .............. *F01D 5/28* (2013.01); *F01D 11/122* (2013.01); *F05D 2230/237* (2013.01); *F05D 2300/175* (2013.01); *F05D 2300/2282* (2013.01)

(58) Field of Classification Search
CPC . F01D 11/122; F01D 5/20; F01D 5/28; F01D 5/288; F05D 2300/175;
(Continued)

(56) References Cited

U.S. PATENT DOCUMENTS 5,359,770 A * 11/1994 Brown .................... C23C 26/00 29/889.71
5,952,110 A * 9/1999 Schell ..................... F01D 11/12 427/427

(Continued)

FOREIGN PATENT DOCUMENTS

CN 109424369 A 3/2019
EP 2963144 B1 2/2019

(Continued)

*Primary Examiner* — Courtney D Heinle
*Assistant Examiner* — Cameron A Corday
(74) *Attorney, Agent, or Firm* — Paul Frank + Collins P.C.

(57) ABSTRACT

The disclosure concerns an abrasive gas turbine blade tip cap preform for bonding to a blade tip to form an abrasive blade tip cap, the abrasive gas turbine blade tip cap preform being formed of a bonding layer and an abrasive layer, the bonding layer being a metallic layer comprising powder size particles of a nickel braze alloy and a nickel base superalloy, and the abrasive layer being a ceramic layer in a metal matrix comprising powder size particles of cubic boron nitride (cBN) and aluminum oxide ($Al_20_3$) in a metal matrix of same composition of the bonding layer. The disclosure also concerns a method of manufacturing an abrasive gas turbine blade tip cap preform and a method of bonding the
(Continued)

abrasive gas turbine blade tip cap preform to a blade tip to form an abrasive blade tip cap.

7 Claims, 3 Drawing Sheets

(58) Field of Classification Search
CPC ..... F05D 2300/2112; F05D 2300/2282; F05D 2300/6032
See application file for complete search history.

(56) References Cited

U.S. PATENT DOCUMENTS

| | | | | |
|---|---|---|---|---|
| 8,075,662 | B2 * | 12/2011 | Minor | B23K 35/304 75/254 |
| 8,640,942 | B1 | 2/2014 | Ozaysal et al. | |
| 9,511,436 | B2 | 12/2016 | Kumar et al. | |
| 10,018,056 | B2 * | 7/2018 | Stratton | B23K 35/304 |
| 10,030,527 | B2 * | 7/2018 | Stratton | B23K 35/0222 |
| 10,053,994 | B2 * | 8/2018 | Stratton | F01D 5/288 |
| 10,392,938 | B1 * | 8/2019 | Ghunakikar | F01D 5/288 |
| 11,788,422 | B2 * | 10/2023 | Schumann | B23K 1/0018 416/241 R |
| 11,866,830 | B2 * | 1/2024 | Martel | C25D 5/14 |
| 2015/0118060 | A1 | 4/2015 | Kumar et al. | |
| 2015/0132605 | A1 | 5/2015 | Kumar et al. | |
| 2015/0375321 | A1 * | 12/2015 | Cui | C22C 47/06 428/408 |
| 2016/0069195 | A1 * | 3/2016 | Hewitt | F01D 5/20 416/241 B |
| 2018/0216478 | A1 * | 8/2018 | Martel | C25D 15/00 |
| 2018/0311772 | A1 * | 11/2018 | Stratton | F01D 11/122 |

FOREIGN PATENT DOCUMENTS

| | | | |
|---|---|---|---|
| GB | 2108534 | A | 5/1983 |
| GB | 2551527 | A | 12/2017 |
| JP | 2011249576 | A | 12/2011 |
| RU | 2404286 | C1 | 11/2010 |
| RU | 2624884 | C2 | 7/2021 |
| WO | 2021021231 | A1 | 2/2021 |

* cited by examiner

PRE-SINTERED PREFORM WITH HIGH TEMPERATURE CAPABILITY, IN PARTICULAR AS ABRASIVE COATING FOR GAS TURBINE BLADES

TECHNICAL FIELD

The present disclosure generally relates to the field of turbomachines comprising high temperature components and to high resistance materials applied to such components, for example abrasive coatings and method of applying the same.

According to one embodiment, the present disclosure relates to axial, radial and mixed turbomachines, e.g. compressors and turbines, and more specifically to leakage control between the stationary and rotating components, and include abrasive materials applied to turbine rotor bucket or compressor rotor blade.

According to one embodiment, the present disclosure relates to abrasive coatings applied on rotor bucket tips to form a dynamic seal with the statoric part, called a shroud, to reduce the gas flow leakage and increase the efficiency of the gas turbine engine through the use of advanced materials and coatings with high temperature capability.

BACKGROUND ART

It is known that gas turbines generally include at least one stationary assembly extending over at least one rotor assembly. The rotor assembly includes at least one row of circumferentially spaced, rotatable, metallic turbine blades. The blades include metallic airfoils that extend radially outward from a rotatable hub to a metallic tip. Many of such metallic airfoils of rotor blades are fabricated from materials such as Nickel (Ni) based superalloys.

Stationary assemblies of turbomachines include surfaces that form metallic shrouds that may be routinely exposed to a hot gas flux. Some of such metallic surfaces include an applied metallic-based MCrAlY (where M=Co, Ni or Co/Ni, Cr=Chromium, Al=Aluminum and Y=Yttrium) coating and/or an applied ceramic thermal barrier coating that forms a shroud over the stationary assembly. Alternatively, some such metallic surfaces include applied ceramic matrix composites with, or without, a protective thermal barrier coating.

The metallic tips and the metallic shrouds define a tip clearance therebetween. However, such tip clearances are not suitable for high-temperature units that need high efficiencies. In order to reduce such tip clearances, gas turbines include abradable shrouds formed over the stationary assembly and the blade tips include an abrasive material formed thereon that has a greater hardness value than the blade material and the abradable coating. The abrasive material abrades the shroud coatings as the rotor assembly rotates within the stationary assembly. The abradable shroud coatings and the abrasive tips define a tip clearance therebetween. The tip clearance is small enough to facilitate reducing axial flow through the gas turbine that bypasses the blades, thereby facilitating increased efficiency and performance of the gas turbine. The tip clearance is also large enough to facilitate rub-free gas turbine operation through the range of available gas turbine operating conditions.

Various materials and processes have been suggested to provide a suitable abrasive tip cap on turbine stator and rotor blades. Typical abrasive materials used include silicon carbide, aluminum oxide, tantalum carbide and cubic boron nitride. The particles of abrasive material are usually incorporated with a metal matrix, including for example, nickel or cobalt-base alloys, to provide a sufficiently strong structure that can be bonded to the blade tip. However, the thickness of such a metal matrix is often limited because of the structural weakness of the abrasive composition.

In addition, some abrasive materials are damaged by high temperatures. As an example, for temperatures above approximately 927° C. (1700° F.), cubic boron nitride becomes unstable and is prone to oxidation. Also, while silicon carbide is better suited to survive temperatures in excess of approximately 927° C. (1700° F.), silicon carbide abrasives include free silicon that may attack the Ni/Co (Nickel/Cobalt) alloy substrates.

In some applications, it is conventional to apply the abrasive composition to the rotor blade tip using a thermal spray technique, such as plasma spraying or detonation gun spraying. Subsequent processes are typically necessary to provide the adhesion and structural integrity necessary for the abrasive composition to survive the hostile environment of a gas turbine. Such steps often include adhering the abrasive composition to the blade tip during a first heating and cooling cycle, and later depositing an additional quantity of the metal matrix over the abrasive composition through a second heating and cooling cycle, such as during hot isostatic pressing. As an alternative, it has also been suggested to melt the tip of the blade, such as with lasers, introduce the abrasive to the blade tip, and then re-solidify the blade tip.

While the above processes may be suitable for some turbine blade structures, turbine blade used in modern gas turbine engines are often fabricated from cast high temperature nickel-base superalloys having a single crystal microstructure. Single crystal blades are characterized by extremely high oxidation resistance and mechanical strength at elevated temperatures, which are necessary for the performance requirements of modern gas turbines. However, the single crystal microstructure must not be affected by the process by which the rotor blade abrasive tip caps are secured to the rotor blades. In particular, the process must not recrystallize the single crystal microstructure of the rotor blade, such that the high temperature properties of the rotor blade are lost or diminished. As a result, processes which entail melting the rotor blade tip to the single crystal rotor blade are entirely unacceptable. In addition, repeated thermal cycling of the rotor blade runs the risk of degrading the single crystal microstructure of the rotor blade.

Thus, it would be desirable to provide an abrasive composition which can be readily formed into an abrasive blade tip cap and which can be attached to a turbine rotor blade in a single heating and cooling cycle, under controlled temperature so as to minimize any degradation of the microstructure of a single crystal turbine rotor blade.

SUMMARY

In one aspect, the subject matter disclosed herein is directed to an abrasive material preform configured to be fixedly coupled to a gas turbine rotor blade through a single heating and cooling cycle under controlled temperature.

In another aspect, the subject matter disclosed herein is directed to a method for producing such an abrasive material preform.

In yet another aspect, the subject matter disclosed herein is directed to a method for attaching such an abrasive material preform to a gas turbine blade in a single heating and cooling cycle to preserve the microstructure of a single crystal rotor blade and the stability of the abrasive material.

BRIEF DESCRIPTION OF THE DRAWINGS

A more complete appreciation of the disclosed embodiments of the invention and many of the attended advantages thereof will be readily obtained as the same becomes better understood by reference to the following detailed description when considered in connection with the accompanying drawings, wherein.

DETAILED DESCRIPTION OF EMBODIMENTS

Figure 1:
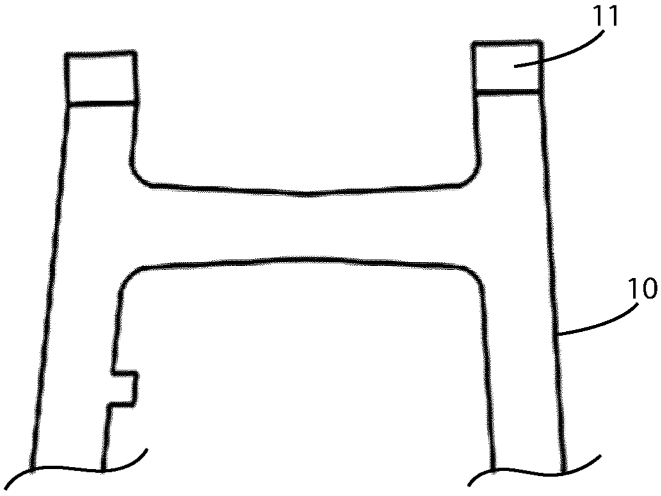
FIG. 1 illustrates a cross section of a gas turbine blade coated with an abrasive material preform.

In one aspect, the subject matter disclosed herein is directed to an abrasive material preform 11 configured to be fixedly coupled to a gas turbine rotor blade 10 through a single heating and cooling cycle under controlled temperature to realize a gas turbine blade 10 coated with an abrasive material preform 11 as shown in FIG. 1.

According to one aspect, the subject matter disclosed herein is more specifically directed to a pre-sintered abrasive material preform 11 composed of a homogeneous mixture of a superalloy base material and braze alloy powders configured to be tack welded on a blade tip and then vacuum brazed, to realize a gas turbine blade 10 coated with an abrasive material preform 11 as shown in FIG. 1.

In the present disclosure, the term powder is used according to its generally known meaning, to identify fine, dry, solid particles with mesh size between few to thousands of microns.

Additionally, in the present disclosure, the term sintering is also used according to its generally known meaning, to identify a process of compacting and forming a solid mass of material by heat or pressure without melting it to the point of liquefaction.

The term "preform" is used in the present disclosure to identify a preliminarily shaped component.

Figure 2:
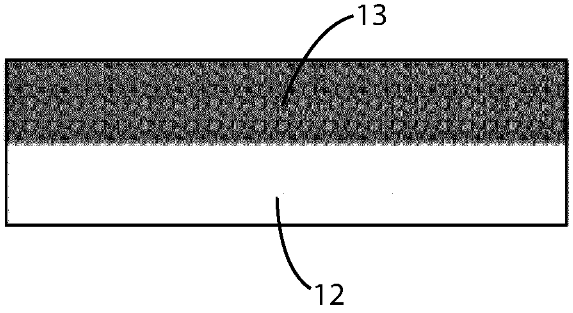
FIG. 2 illustrates a cross section of an abrasive material preform.

FIG. 2 illustrates a section view of a pre-sintered preform 11, which is formed of two layers, namely a bonding layer 12, for coupling with a blade tip, and a top layer 13 or abrasive layer 13. According to an exemplary embodiment, thickness of each layer is 50%±15% of total preform thickness required for the application. In particular, according to an exemplary embodiment, the bonding layer 12 can be a metallic layer obtained by sintering a blend of a nickel braze alloy powder and a nickel base superalloy powder, as described in the following and the top layer 13 can be a ceramic layer in a metal matrix produced by sintering a blend of a cubic boron nitride (cBN) powder and an aluminum oxide ($Al_2O_3$) powder in a metal matrix of same composition of the bonding layer. The two layers may be obtained by a single sintering operation, or by a sequence of sintering operations, including the bonding of the separately sintered two layers.

According to an exemplary embodiment, a pre-sintered preform can be a sintered powder metallurgy product composed of a bonding layer 12 composed of a homogeneous mixture of superalloy base material and braze alloy powders and of a top layer 13 or abrasive layer 13 composed of abrasive powders, also called abrasive grits, with a composition within the ranges of Table 1.

TABLE 1

| ID | Powder Blend | Powder type | Weight (%) |
|---|---|---|---|
| 1 | Bonding | Ni based superalloy | 50 ± 15 |
| | | Ni based Braze alloy | 50 ± 15 |
| 2 | Abrasive | Cubic Boron Nitride (cBN) | 25 ± 7.5 |
| | | Aluminum Oxide ($Al_2O_3$) | 25 ± 7.5 |
| | | Bonding (see ID 1 ) | 50 ± 15 |

The metallic and abrasive powders are chosen to withstand high temperatures in gas turbine section. In particular, the abrasive grits ensure both short term cutting capability and thermal stability, assuring the clearance maintenance over time.

Powder particle size shall meet the following requirements:

cBN powder particle size shall be in a range of 181-277 mesh in 93% wt minimum

Al oxide powder particle size shall be 100 mesh in 40% wt minimum

Ni based superalloy powder particle size shall be 395 mesh in 95% wt minimum

Ni based braze alloy powder particle size shall be 395 mesh in 95% wt minimum

In an exemplary embodiment of the system, the composition of the nickel braze alloy powder is referred to in Table 2.

TABLE 2

| Element | Weight (%) |
|---|---|
| Nickel | 46.71-55.21 |
| Cobalt | 13.5-16.5 |
| Chromium | 18.5-21.5 |
| Aluminum | 4.2-5.8 |
| Silicon | 7.5-8.4 |
| Total other elements | <1.1 |

In an exemplary embodiment of the system, the composition of the nickel based superalloy powder is referred to in Table 3.

TABLE 3

| Element | Weight (%) |
|---|---|
| Nickel | 55.61-60.36 |
| Cobalt | 11.35-12.1 |
| Chromium | 6.5-7.2 |
| Aluminum | 5.9-6.6 |

TABLE 3-continued

| Element | Weight (%) |
|---|---|
| Tantalum | 6.1-6.7 |
| Tungsten | 4.5-5.3 |
| Hafnium | 1.2-1.8 |
| Rhenium | 2.5-3.1 |
| Total other elements | <1.6 |

Figure 3:
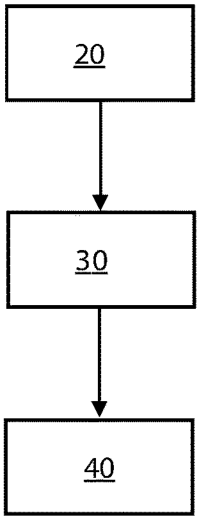
FIG. 3 illustrates a flowchart of a new, improved method of making an abrasive gas turbine blade tip cap preform for bonding to a blade tip to form an abrasive blade tip cap on the tip of a gas turbine blade.

According to an exemplary embodiment, a pre-sintered preform 11 is realized through the process shown in FIG. 3, by forming 20 a tape or a sheet, which is formed of two layers, namely a bonding layer 12, and a top layer 13 or abrasive layer 13, with the composition specified above. The tape or sheet is then sintered, i.e. vacuum heat treated 30 to 80-90% of the brazing temperature and subsequently cut 40 to desired shape.

Figure 4:
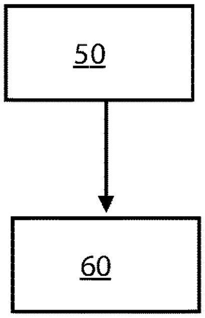
FIG. 4 illustrates a flowchart of a new, improved method of applying an abrasive material preform on the tip of a gas turbine blade.

According to an exemplary embodiment, a pre-sintered preform 11 is coupled to a gas turbine blade tip through the process shown in FIG. 4, by tack welding 50 the pre-sintered preform 11 to the tip of a gas turbine blade 10 and vacuum brazing 60 to bond the pre-sintered preform 11 to the tip.

Figure 5:
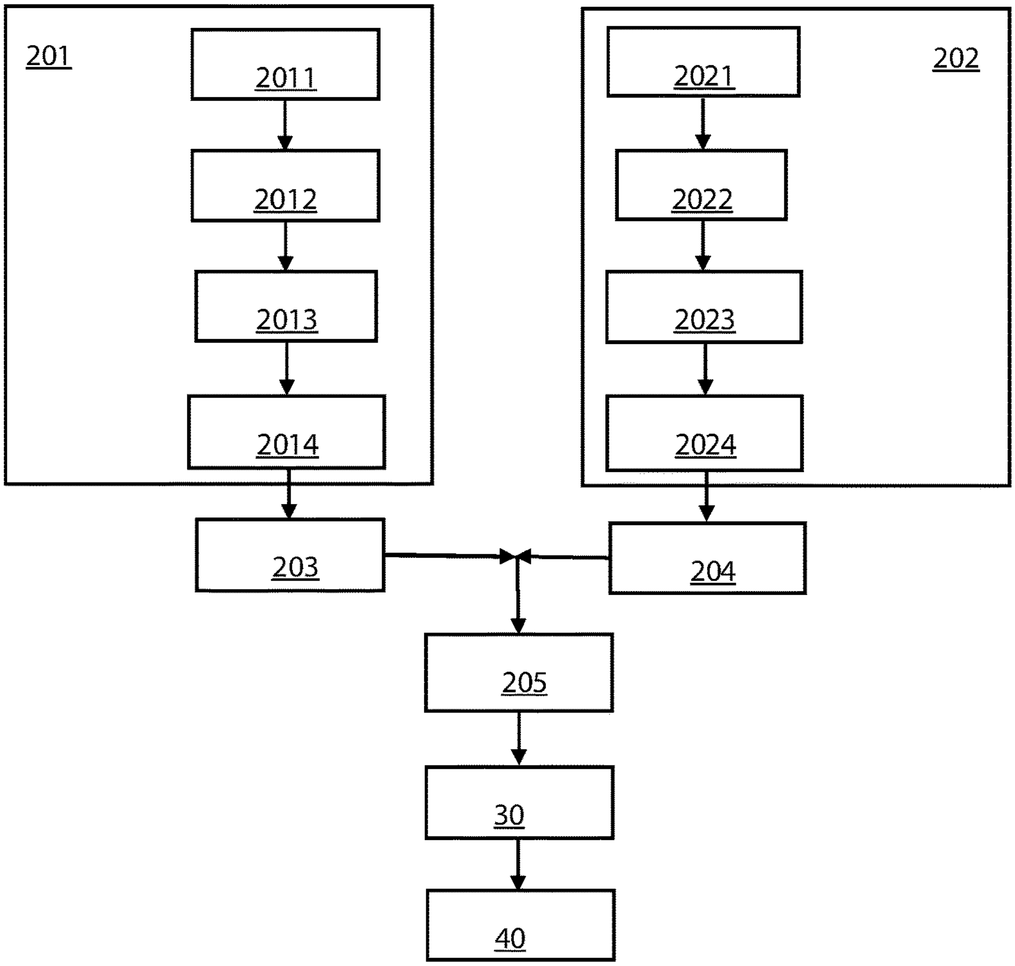
FIG. 5 illustrates a flowchart of a first exemplary embodiment of the method of making an abrasive gas turbine blade tip cap preform of FIG. 3.

In particular, as shown in FIG. 5, the pre-sintered preform made of two layers is manufactured by a sequence of subsequent sintering processes. Each layer can be manufactured individually in a form of flexible sheet driven by a conveyor belt: namely by a bonding layer manufacturing process 201 and relative pre-sintering 203 and an abrasive layer manufacturing process 202 and relative pre-sintering 204. According to the bonding layer manufacturing process 201, the two metallic powders used to form the bonding layer 12 are mixed 2011 together with a binder to produce a paste which is pressed 2012 between opposite rollers. When the flexible sheet reaches the proper thickness, it is cut 2013 and weighted 2014 to form a tape. The sheet or tape is then pre-sintered 203, i.e. put in high vacuum furnace and vacuum heat treated 1150-1180° C. to obtain a pre-sintered sheet or tape. According to the abrasive layer manufacturing process 202, the cubic boron nitride (cBN) powder, the aluminum oxide ($Al_2O_3$) powder and the two metallic powders of same composition of the bonding layer used to form the abrasive layer 13 are mixed 2021 together with a binder to produce a paste which is pressed 2022 between opposite rollers. When the flexible sheet reaches the proper thickness, it is cut 2023 and weighted 2024 to form a tape. The sheet or tape is then pre-sintered 204, i.e. put in a high vacuum furnace and vacuum heat treated at 1150-1180° C. to obtain a pre-sintered sheet or tape. The two pre-sintered sheets or tapes are then placed 205 one on the top of the other to form a sheet or tape composed of a bonding layer 12 and a top layer 13 or abrasive layer 13. The sheet or tape is then sintered 30 to couple the two layers together in a high vacuum furnace, at pressure minor than 5×10E-4 torr and subsequently cut 40 to form the final pre-sintered preform 11.

Figure 6:
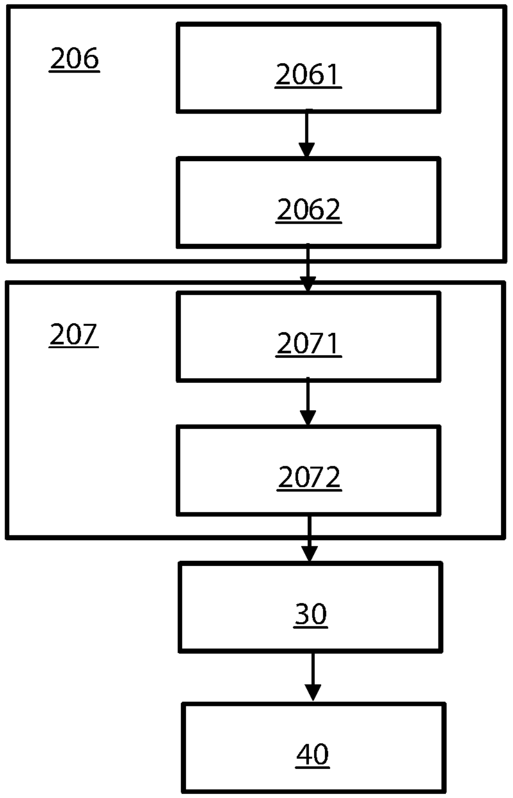
FIG. 6 illustrates a flowchart of a second exemplary embodiment of the method of making an abrasive gas turbine blade tip cap preform of FIG. 3.
Figure 7:
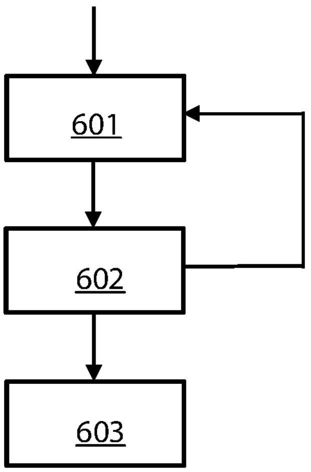
FIG. 7 illustrates a flowchart of an exemplary embodiment of the method of applying an abrasive material preform on the tip of a gas turbine blade of FIG. 4.

Alternatively, according to an exemplary embodiment, as shown in FIGS. 6, the pre-sintered preform made of two layers is manufactured by simultaneously sintering the two layers. The two metallic powders used to form 206 the bonding layer 12 are mixed 2061 together with a binder to produce paste which is pressed 2062 between opposite rollers. When the flexible sheet reaches the proper thickness, the same mixing 2071 and pressing 2072 steps are performed to form 207 the abrasive layer 13 with embedded ceramic particles arranged on the top of the bonding layer 12. The two sheets are then simultaneously sintered 30 and coupled together in a high vacuum furnace, at pressure minor than 5×10E-4 torr and subsequently cut 40 to form the final pre-sintered preform 11.

According to an exemplary embodiment, the brazing step 60 of blade 10 with previously tack welded 50 preform 11 is carried out at 1200-1220° C. at a pressure lower than 5×10E-4 torr. According to an exemplary embodiment, also shown in FIG. 6, subsequent sub-steps of reiterated heating 601 and diffusion 602 are carried out, at a temperature of the diffusion sub-step 602 between 1178° C. and 1198° C., to realize proper bonding between preform 11 and blade 10. The brazing step is then concluded by quenching 603, lowering the temperature down to room temperature.

According to an exemplary embodiment, the brazing step 60 of blade 10 has to follow the following thermal cycle:

heating up to 1038° C. in 150 minutes
holding at 1038° C. for 30 minutes
heating up to 1177° C. in 20 minutes
holding at 1177° C. for 30 minutes
heating up to 1218° C. in 5 minutes
holding at 1218° C. for 20±5 minutes
argon quenching to room temperature (1.2÷1.8 bar).

The aim of the heat treatment of the brazing step 60 is multiple:

- to bond ceramic particles with metallic matrix to reach abrasive properties needed by the blade to prevent excessive wear during run against statoric shroud;
- to minimize degradation of Nickel base superalloy, for instance the recrystallization of machined root.

The single furnace run of the assembly is aimed to get a lean process with reduced time compared to thermal sprayed or electrolytic abrasive coatings.

An important advantage of the exemplary embodiment of the presintered preforms is the possibility of using such preforms at high temperature, tested up to 980° C. metal temperature. The pre-sintered preforms can also be produced as net shape preforms, in order to reduce waste and be flexible for the application on axial, radial and mixed turbomachines.

An additional application of the pre-sintered preforms according to the exemplary embodiments herein disclosed might be an assembly of combustion liner and transition piece which slide past each other, the transition piece channeling the high-temperature gas from the combustion liner to a first statoric nozzle of a gas turbine.

Another application of the pre-sintered preforms according to the exemplary embodiments herein disclosed on gas turbine blades might be angel wing seals between a rotor blade and nozzle in a turbine, which inhibits ingestion of hot gas from a hot gas flow through the turbine into turbine wheel spaces.

Still another application of the pre-sintered preforms according to the exemplary embodiments herein disclosed is to realize sealing among rotating turbine components, stationary nozzles, and casing of a gas turbine, such as on J-seals. It is known that J-seals are an integral part of efficient steam turbine operation. The failure of a J-seal can cause significant damage to a turbine rotor as material migrates downstream. For that reason, plant staff must conduct inspections of steam path systems to identify potential problems during regularly scheduled outages in order to check the integrity of the sealing. Steam turbine efficiency relies heavily on integrity and performance of steam path stage-to-stage seals. Using abrasive pre-sintered preforms according to the exemplary embodiments herein disclosed can result in a significant advantage in sealing among rotating turbine components, stationary nozzles, and casing by allowing for a long-lasting integrity of seals.

Barzanò & Zanardo Roma S.p.A.

The invention claimed is:

1. An abrasive gas turbine blade tip cap preform, comprising:

two pre-sintered layers sintered directly to one another prior to bonding to a gas turbine blade tip, the two pre-sintered layers comprising:

a bonding layer; and an abrasive layer, wherein the bonding layer comprises a metallic layer comprising a homogeneous mixture of a nickel braze alloy powder, a nickel base superalloy powder, and a binder in a first metal matrix, wherein the abrasive layer comprises a ceramic layer in a second metal matrix comprising a cubic boron nitride (cBN) powder, an aluminum oxide ($Al_2O_3$) powder, and a binder in a second metal matrix, wherein the first metal matrix and the second metal matrix have a composition that is the same, wherein the bonding layer can bond to the gas turbine blade tip under a thermal cycle that varies temperature from 1038° C. to 1218° C. over 250 minutes, and wherein the bonding layer and the abrasive layer are each pre-sintered independently and subsequently sintered together to form a unified preform prior to bonding to the blade tip.

2. The abrasive gas turbine blade tip cap preform of claim 1, wherein the thickness of the bonding layer is 50%±15% of a total thickness of the abrasive gas turbine blade tip cap preform.

3. The abrasive gas turbine blade tip cap preform of claim 1, wherein the bonding layer is composed of 50%±15% by weight of powder size particles of Ni based superalloy and 50%±15% by weight of powder size particles of Ni based braze alloy.

4. The abrasive gas turbine blade tip cap preform of claim 1, wherein the abrasive layer is composed of 25%±7.5% by weight of powder size particles of cubic boron nitride (cBN) and 25%±7.5% by weight of powder size particles of aluminum oxide ($Al_2O_3$) in 50%±15% by weight of a metal matrix, the metal matrix being composed of 50%±15% by weight of Ni based superalloy and 50%±15% by weight of Ni based braze alloy.

5. The abrasive gas turbine blade tip cap preform of claim 1, wherein cubic boron nitride (cBN) particle size is in a range of 181-277 mesh in 93% wt minimum, aluminum oxide particle size is 100 mesh in 40% wt minimum, Ni based superalloy particle size is 395 mesh in 95% wt minimum and Ni based braze alloy particle size is 395 mesh in 95% wt minimum.

6. The abrasive gas turbine blade tip cap preform of claim 1, wherein said nickel braze alloy is composed of: cobalt 13.5-16.5% by weight, chromium 18.5-21.5% by weight, aluminum 4.2-5.8% by weight, silicon 7.5-8.4% by weight, nickel 46.71-55.21% by weight, other elements less than 1.1% by weight.

7. The abrasive gas turbine blade tip cap preform of claim 1, wherein said nickel based superalloy is composed of:

cobalt 11.35-12.1% by weight, chromium 6.5-7.2% by weight, aluminum 5.9-6.6% by weight, tantalum 6.1-6.7% by weight, tungsten 4.5-5.3% by weight, hafnium 1.2-1.8% by weight, rhenium 2.5-3.1% by weight, nickel 55.61-60.36% by weight, other elements less than 1.6% by weight.

* * * * *